(12) United States Patent
Zhang

(10) Patent No.: US 8,455,127 B2
(45) Date of Patent: Jun. 4, 2013

(54) BATTERY COVER LATCHING ASSEMBLY AND PORTABLE ELECTRONIC DEVICE UTILIZING SAME

(75) Inventor: Yu Zhang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 369 days.

(21) Appl. No.: 12/791,066

(22) Filed: Jun. 1, 2010

(65) Prior Publication Data
US 2011/0244289 A1    Oct. 6, 2011

(30) Foreign Application Priority Data
Mar. 31, 2010    (CN) .......................... 2010 1 0137018

(51) Int. Cl.
*H01M 2/10*    (2006.01)
(52) U.S. Cl.
USPC ............................................. 429/97; 429/96

(58) Field of Classification Search
USPC ........................................................... 429/97
See application file for complete search history.

(56) References Cited

U.S. PATENT DOCUMENTS
2006/0166083 A1* 7/2006 Zhang et al. .................... 429/97

FOREIGN PATENT DOCUMENTS
CN        101436731 A    5/2009

* cited by examiner

*Primary Examiner* — Ula C Ruddock
*Assistant Examiner* — Jacob Marks
(74) *Attorney, Agent, or Firm* — Altis Law Group, Inc.

(57) ABSTRACT

A portable electronic device includes a housing defining, an operating module, and a battery cover. The housing defines a receiving hole and a connector hole. The operating module includes an operating element, and an elastic element. An operating block projects from the operating element and is slidably received in the receiving hole. The elastic element is elastically positioned between the housing and the operating element. The battery cover can be pivotably attached to the housing and latches with the operating element.

16 Claims, 9 Drawing Sheets

BATTERY COVER LATCHING ASSEMBLY AND PORTABLE ELECTRONIC DEVICE UTILIZING SAME

BACKGROUND

1. Technical Field

The exemplary disclosure generally relates to battery cover latching assembly and, particularly, relates to a battery cover latching assembly and a portable electronic device utilizing the assembly.

2. Description of Related Art

Batteries are widely used in portable electronic devices, such as personal digital assistants (PDAs), mobile phones, and so on. Often, batteries are attachably received in the electronic device, and battery covers are provided to connect with the housings of the electronic devices to secure the batteries inside the electronic devices. Batteries are replaced by opening the battery covers when, for example, the batteries are damaged and/or dead (e.g. no longer rechargeable).

Although battery cover latching assemblies may be simple, the engagement between the battery cover and the housing of the mobile phone or other electronic device, can be too strong to allow easy detachment thereof.

Therefore, there is room for improvement within the art.

BRIEF DESCRIPTION OF THE DRAWINGS

Many aspects of the exemplary battery cover latching assembly can be better understood with reference to the following drawings. The components in the drawings are not necessarily drawn to scale, the emphasis instead being placed upon clearly illustrating the principles of the battery cover latching assembly. Moreover, in the drawings, like reference numerals designate corresponding parts throughout the several views, in which.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
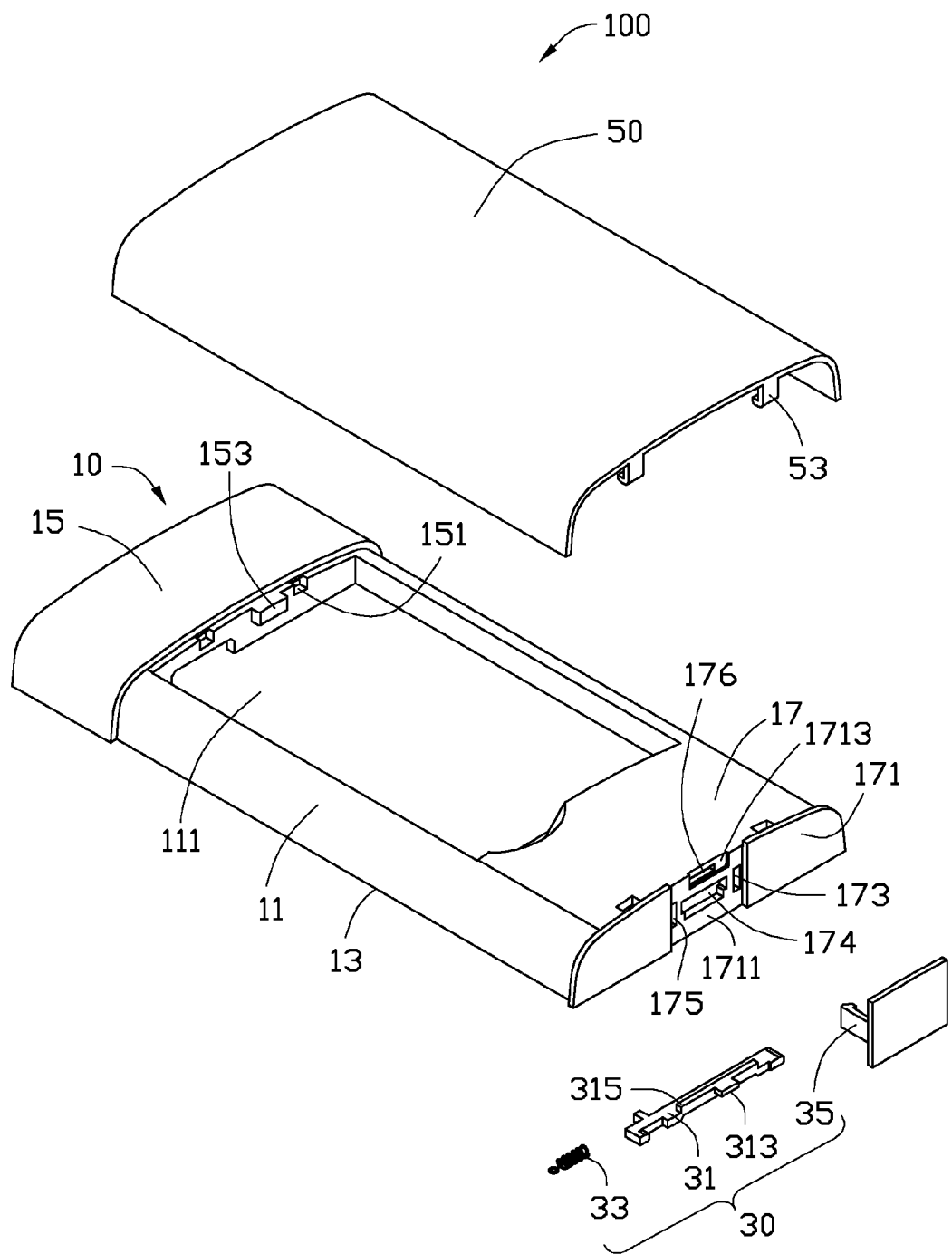
FIG. 1 is an exploded, isometric view of an exemplary embodiment of a battery cover latching assembly for a portable electronic device.

FIG. 1 is an exploded, isometric view of an exemplary embodiment of a battery cover latching assembly 100 for a portable electronic device, such as a cellular phone or any electronic device where battery power is employed. The battery assembly 100 includes a housing 10, an operating module 30, and a removable battery cover 50. The operating module 30 is attached to the housing 10 to releasably secure the battery cover 50 to the housing 10.

The housing 10, which may comprise part of the electronic device, includes a first surface 11 and an opposite second surface 13. The first surface 11 defines a battery compartment 111 therein to receive a battery (not shown) to power the electronic device. The housing 10 includes a first end portion 15 and an opposite second end portion 17 at opposite ends of the battery compartment 111. A retaining block 153 projects from the first end portion 15 and extends into the battery compartment 111. The first end portion 15 defines a receiving slot 151 on each side of the retaining block 153. The second end portion 17 includes an end surface 171. The end surface 171 defines a cutout 1711 therein. The bottom surface of the cutout 1711 defines a receiving groove 1713 communicating with the first surface 11. The bottom of receiving groove 1713 defines a receiving hole 176.

Figure 2:
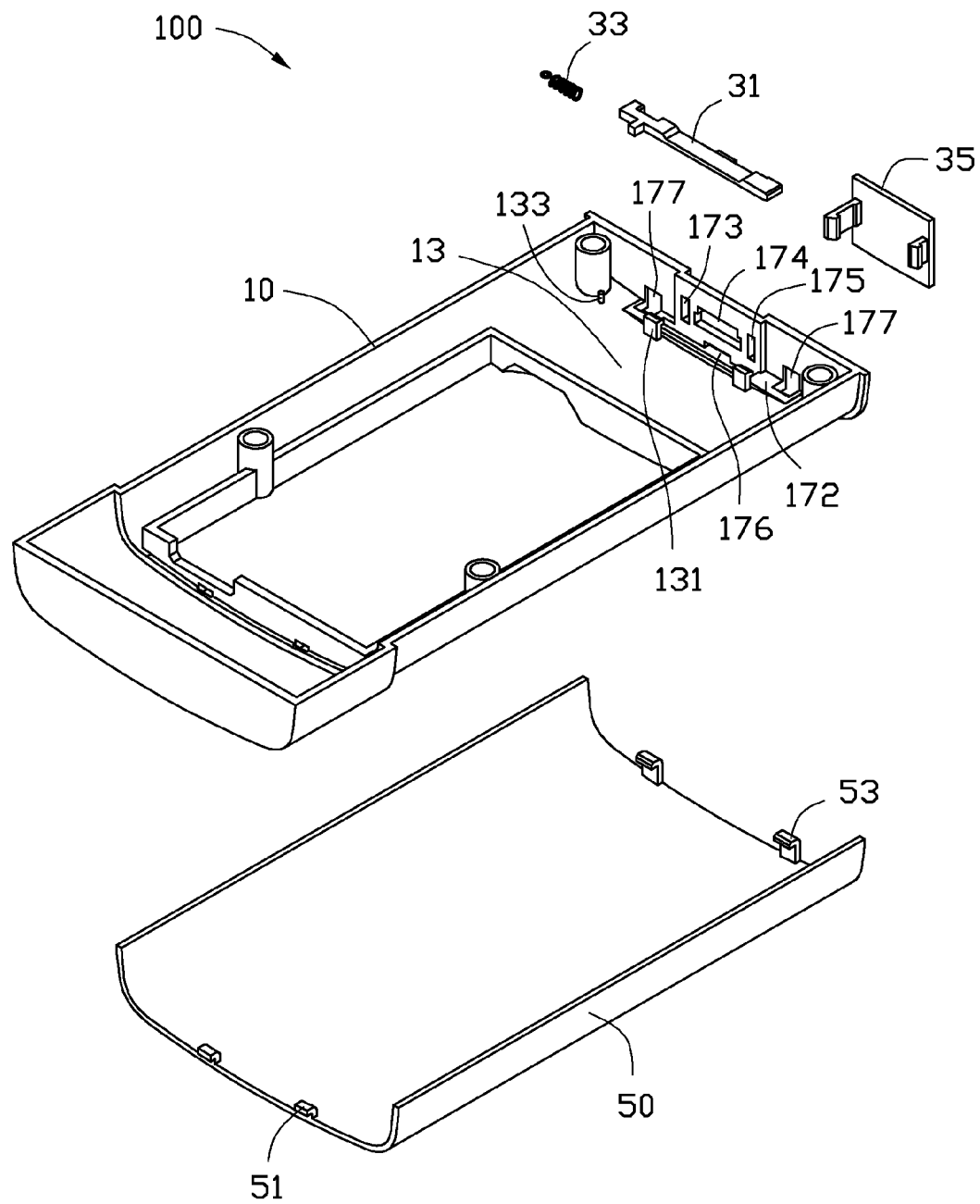
FIG. 2 is similar to FIG. 1, but viewed from another aspect.
Figure 3:
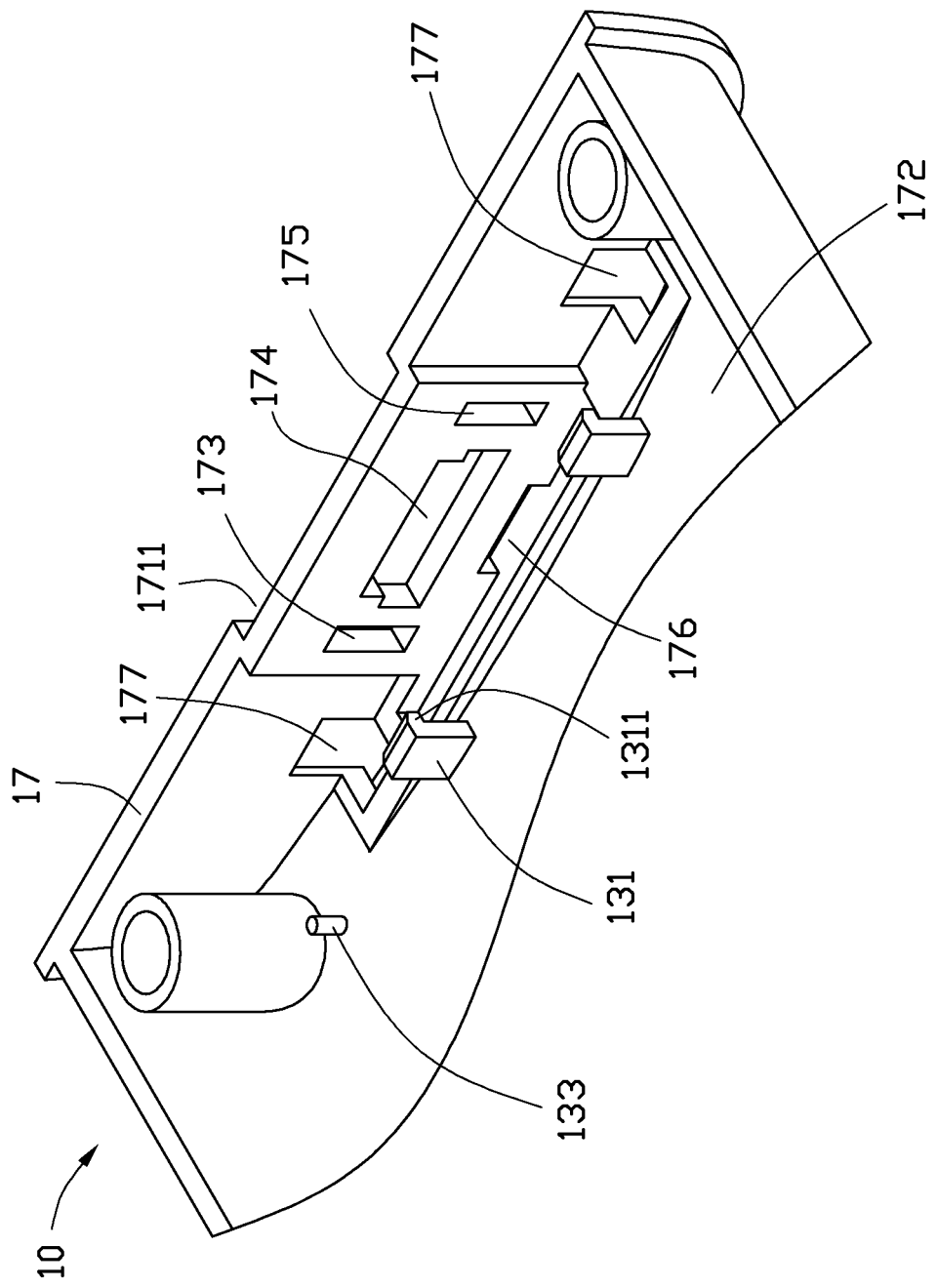
FIG. 3 is an enlarged view of a housing of the battery cover latching assembly.

Referring also to FIGS. 2 and 3, the second surface 13 defines a receiving cavity 172 therein communicating with the receiving hole 176. Two hooks 131 and a post 133 project from the second surface 13, and are spaced from the end surface 171. A latching portion 1311 protrudes from each hook 131. Beneath the receiving hole 176, the second end portion 17 defines a connector hole 174, a first slit 173, and a second slit 175. The first slit 173 and the second slit 175 are arranged at opposite sides of the connector hole 174 and communicate with the receiving cavity 172. The housing 10 further defines two through holes 177 from the first surface 11 to the second surface 13. The through holes 177 each communicate with the receiving cavity 172 and are arranged at opposite sides of the cutout 1711.

Figure 4:
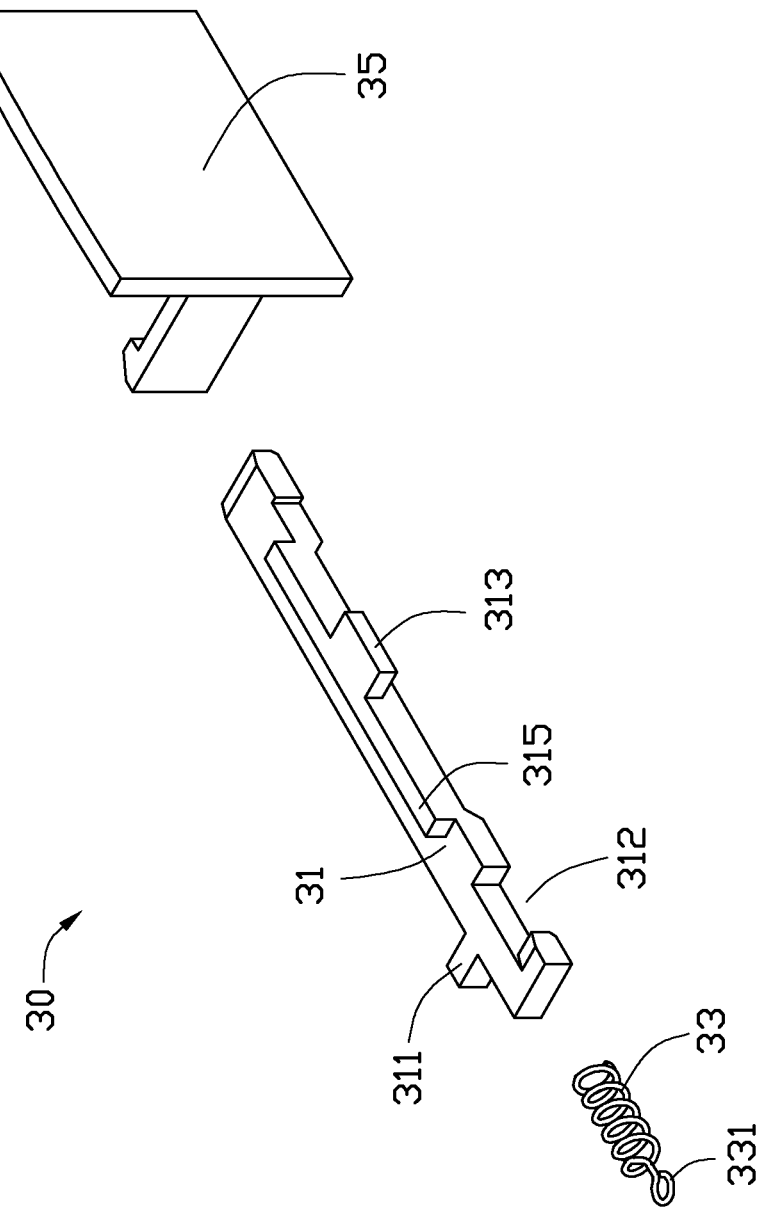
FIG. 4 is an enlarged, isometric view of an operating module in FIG. 1.
Figure 5:
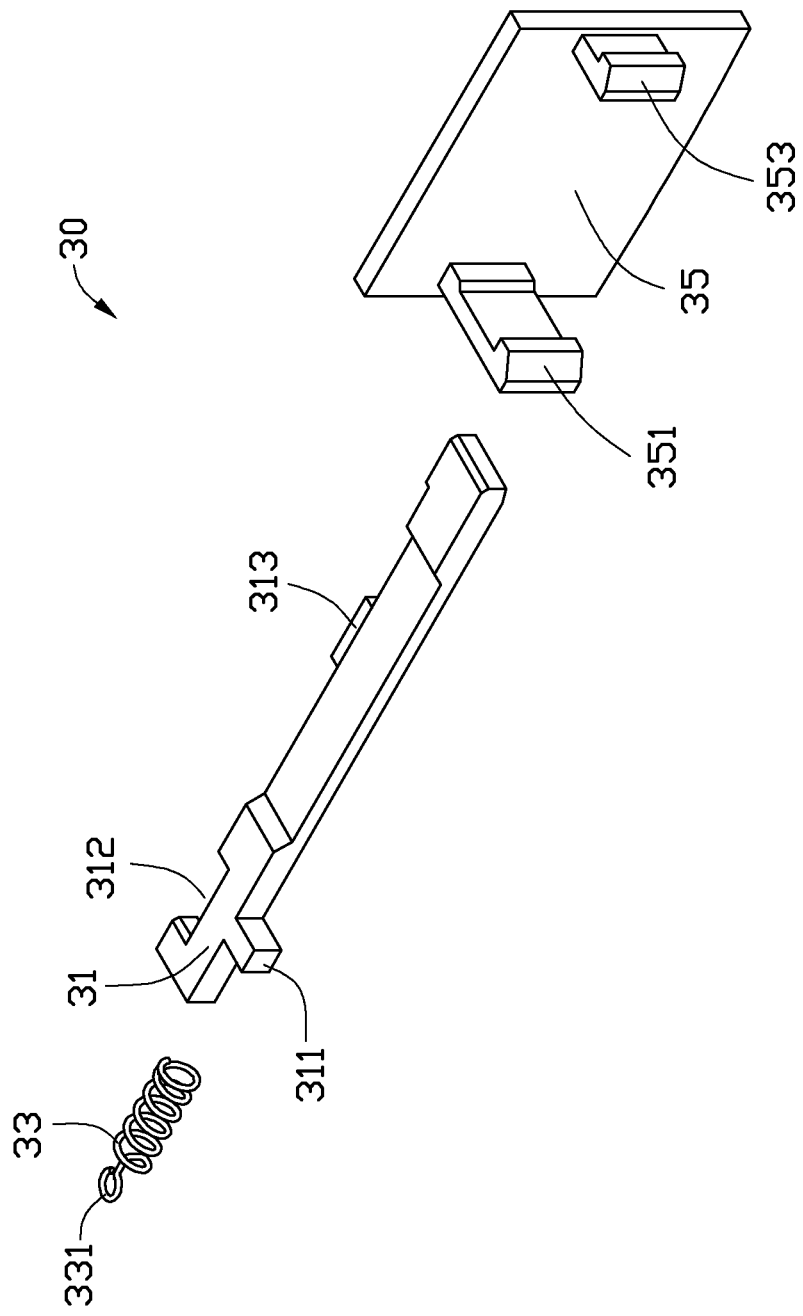
FIG. 5 is enlarged, isometric view of an operating module in FIG. 2.

Referring to FIGS. 4 and 5, the operating module 30 includes an operating element 31, an elastic element 33, and a protective cover 35. The operating element 31 is slidably attached to the housing 10, as described below. One end of the elastic element 33 is coiled around the post 133 and the other end of the elastic element 33 elastically biases against the operating element 31 when sliding the operating element 31 to releasably latch with the battery cover 50. As also described below, the protective cover 35 is rotatably received in the cutout 1711 to shield a portion of the operating element 31 and the connector hole 174.

The operating element 31 is substantially a long beam, and includes a resisting portion 311 perpendicularly projecting from one side and a notch 312 defined in the opposite side. A guiding block 315 protrudes from one surface of the operating element 31. An operating block 313 projects from approximate the middle of the guiding block 315. The operating block 313 is configured to be received in the receiving hole 176.

In the exemplary embodiment, the elastic element 33 is a compression spring having a coiled portion 331 on one end. The protective cover 35 includes a first latching arm 351 and a second latching arm 353 at opposite ends. The first latching arm 351 and the second latching arm 353 are made of flexible material. The length of the first latching arm 351 is longer than that of the second latching arm 353.

Referring back to FIG. 2, the battery cover 50 is configured to cover the housing 10 and secure the battery to the portable electronic device. Two first projections 51 project from one end of the battery cover 50, and two second projections 53 project from the other end of the battery cover 50. The first and second projections 51 and 53 are substantially L-shaped.

The second projections 53 are for being respectively received in the through holes 177 and being removably latched in place by the operating element 31.

Figure 6:
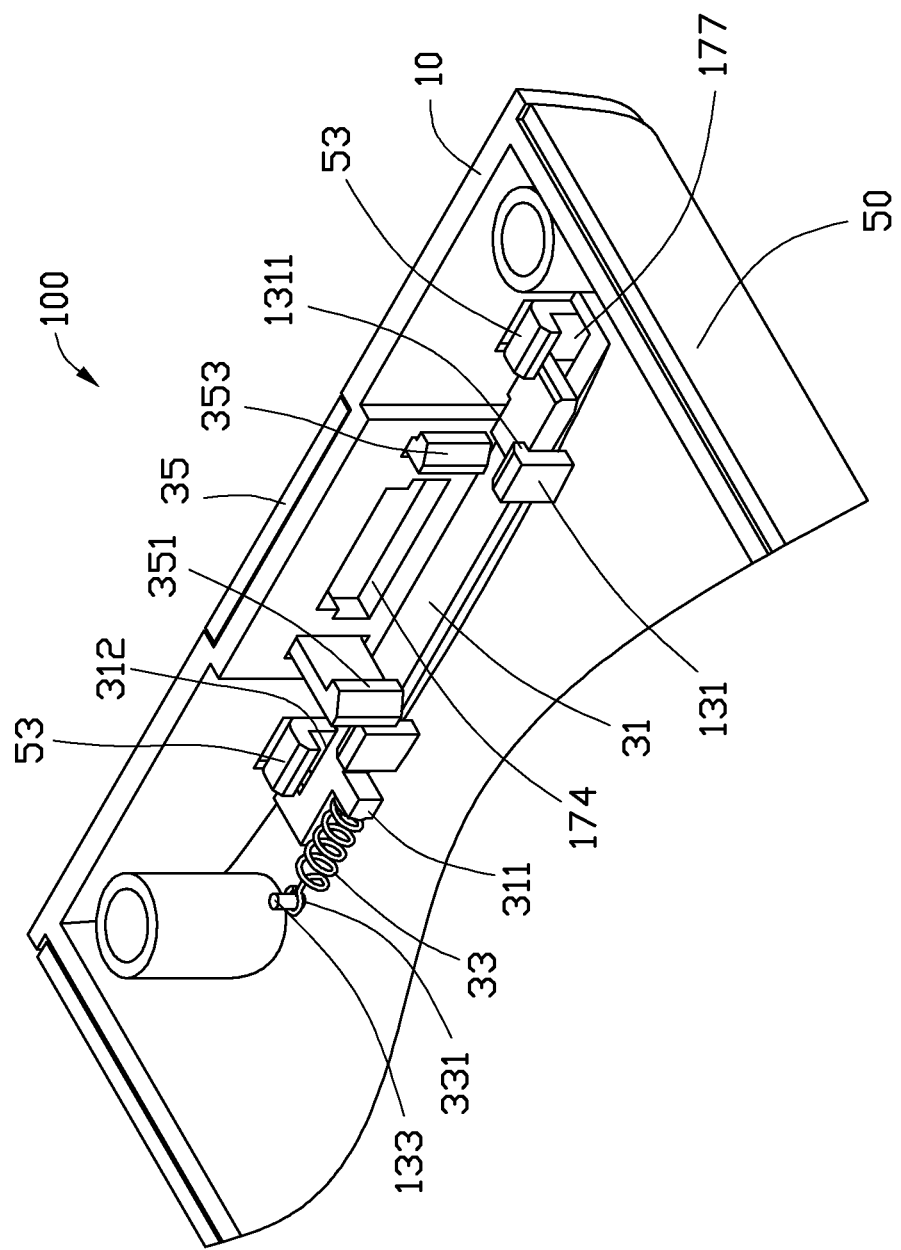
FIG. 6 is an assembled, enlargement of the battery cover latching assembly.

Referring to FIG. 6, during assembly, the operating module 30 is attached to the housing 10. The perpendicularly coiled portion 331 of the elastic element 33 is placed over the post 133. The operating element 31 is received in the receiving cavity 172 and is slidably retained under the latching portions 1311 of the hooks 131. The operating block 313 is inserted into the receiving hole 176 and extends into the receiving groove 1713. The other end of the elastic element 33 elastically resists the resisting portion 311. The first latching arm 351 is received in the first slit 173 and extends into the receiving cavity 172. The second latching arm 353 is received in the second slit 175 and latches with the second end portion 17. An electrical connector (not shown) can be received in the connector hole 174.

Finally, the battery cover 50 is attached to the housing 10. The first projections 51 are respectively received in a corresponding receiving slot 153 of the first end portion 15. The battery cover 50 is then pivoted about projections 51 to insert the second projections 53 into the through holes 177 and latch with the operating element 31. Thus, the assembly 100 is assembled. A portion of the operating element 31 and the connector hole 174 are shielded by the protective cover 35.

Figure 7:
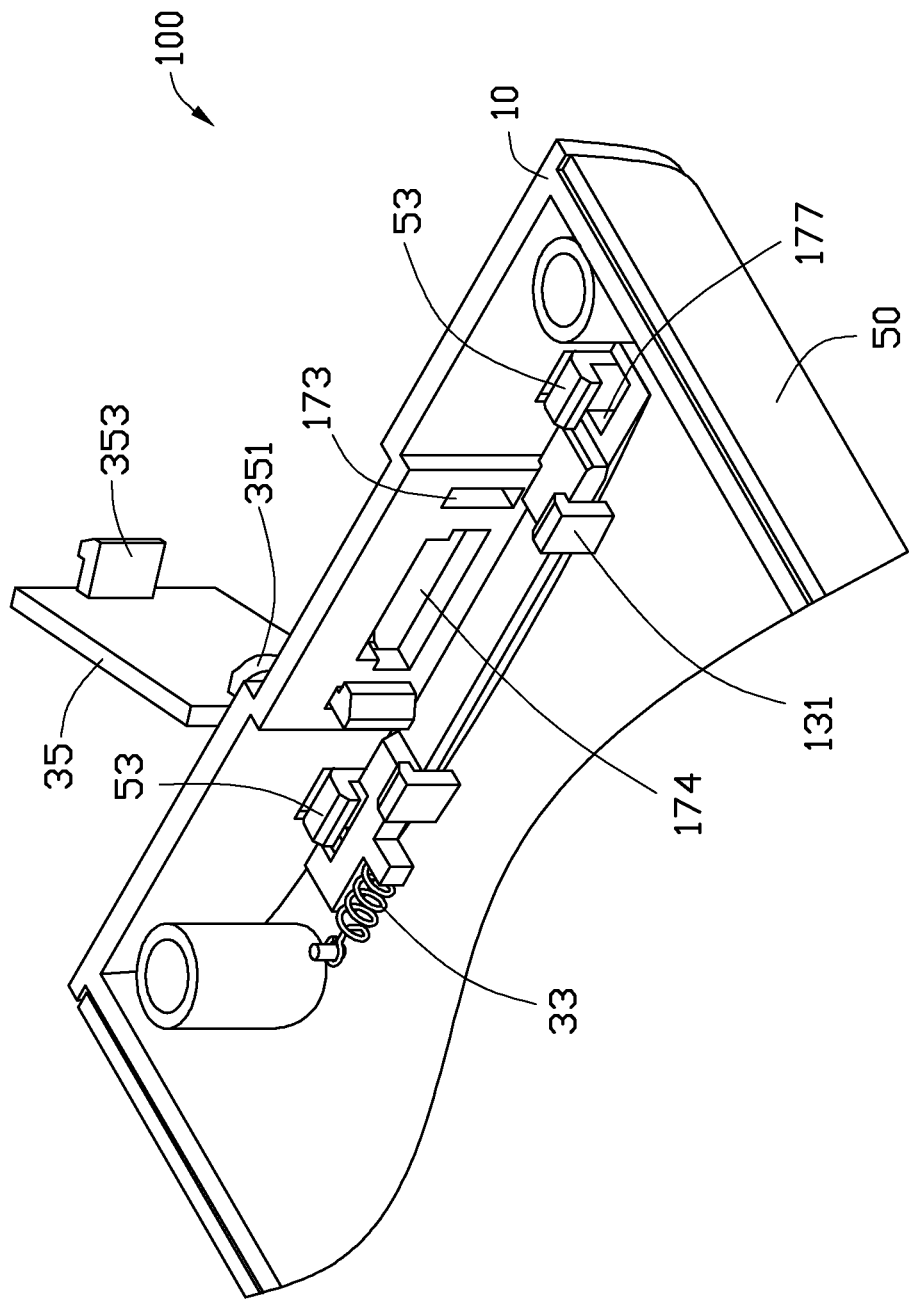
FIG. 7 is similar to FIG. 6, but showing the battery cover latching assembly in an open state.
Figure 8:
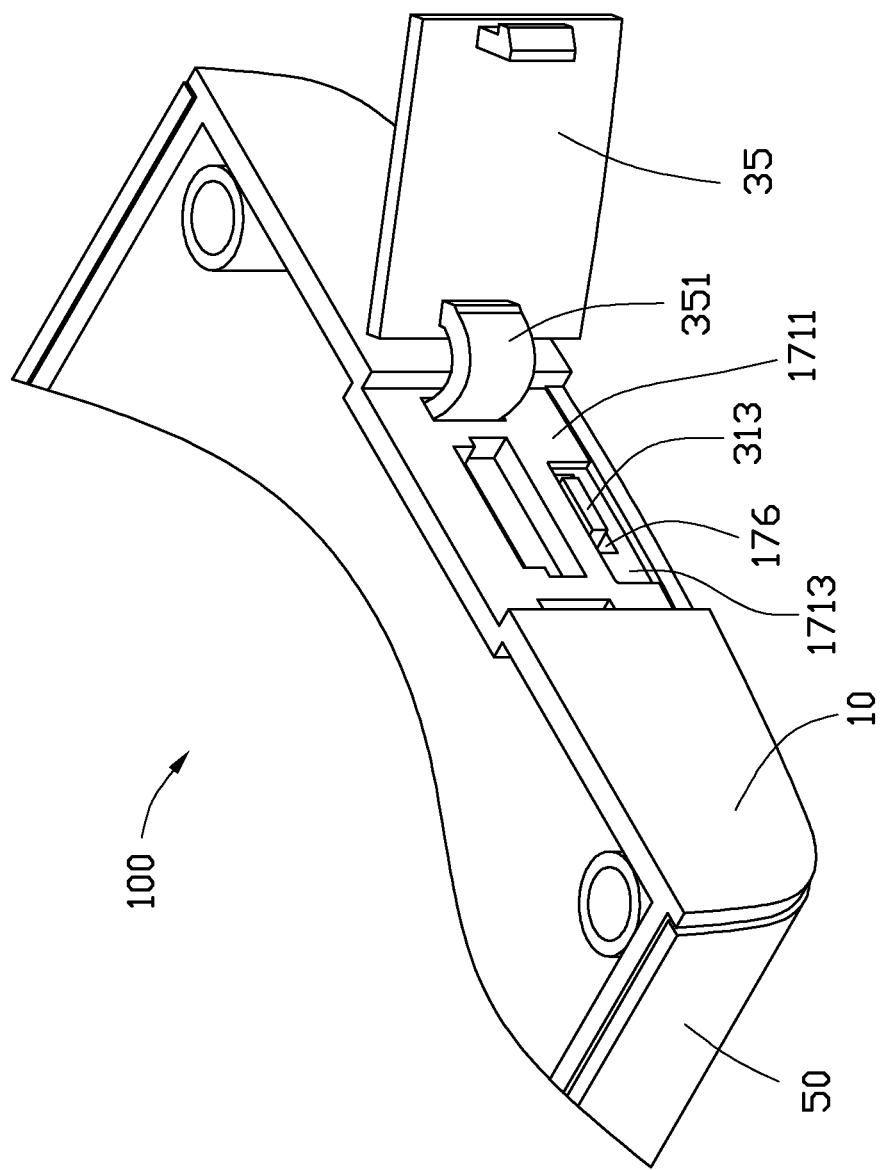
FIG. 8 is similar to FIG. 7, but viewed from another aspect.

Referring to FIGS. 7 and 8, when a battery is to be changed or installed, first, the second latching arm 353 is removed from the second slit 175, and the protective cover 35 is pivoted around the first latching arm 351. The first latching arm 351 is elastically deformed until the protective cover 35 is rotated to expose the operating block 313. Then, the operating block 313 is pushed, e.g., by a finger of the user reaching into the receiving groove 173, to slide the operating element 31 along the receiving cavity 172 towards the post 133. At the same time, the elastic element 33 is elastically deformed. The operating block 313 is further pushed until one of the second projections 53 aligns with the notch 312 and the other projection 53 separates from the operating element 31. Accordingly, the battery cover 50 can be removed from the second projections 53 using the through holes 177 and the battery cover 50 can be further removed from the housing 10. At the same time, the elastic element 33 is elastically deformed, whereby the operating element 31 withdraws by the elastic force thereof on release.

It is to be understood that connector hole 174 can be defined where a connector is desirable while covered by the protective cover 35.

Figure 9:
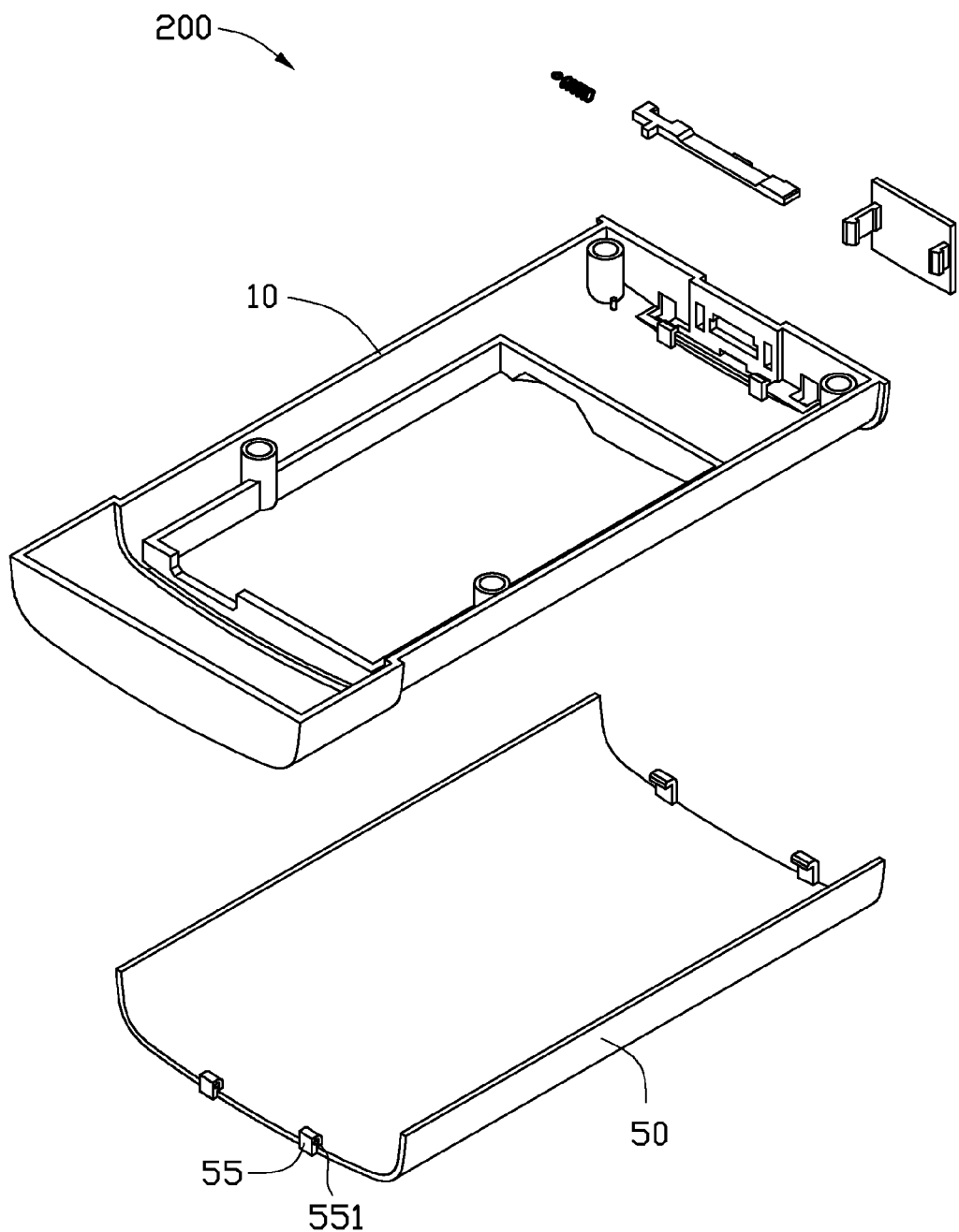
FIG. 9 is an exploded, isometric view of another embodiment of a battery cover latching assembly for a portable electronic device.

Referring to FIG. 9, in another exemplary embodiment of a portable electronic device 200. Two connecting portions 55 project from one end of the battery cover 50. Each connecting portion defines a hole 551 to receive a shaft, a pin or a hinge (not shown) that can be mounted to a portion of the housing 10. Thus, the battery cover 50 can be pivotally attached to the housing 10 by e.g., a hinge or pin.

In the exemplary embodiment of the portable electronic device, by pushing the operating element 31, the battery cover 50 could be removed from the housing 10 such that it is easy to use. Furthermore, the portable electronic device has a protective cover 35 to cover the operating element 31 to prevent the portable electronic device from dust or water penetrating.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A battery cover latching assembly comprising:
a housing defining a receiving hole;
an operating module comprising an operating element and an elastic element elastically positioned between the housing and the operating element, the operating element slidably attached to the housing, the operating element being a long beam, and including two opposite ends and a notch adjacent to one of the two opposite ends, an operating block integrally projected from one surface of the operating element and slidably received in the receiving hole;
a battery cover removably attached to the housing and including two projections for respectively latching with the two ends of the operating element;
wherein the operating block is slid relative to the housing to deform the elastic element, the operating element is moved to separate from one of the projections, and align the notch with the other of the projections for allowing the battery cover to be removed from the housing.

2. The battery cover latching assembly as claimed in claim 1, wherein the housing includes a first surface, a second surface, and an end surface, the first surface defines a battery compartment, the second surface is opposite to the first surface, the end surface is connected between the first surface and the second surface, the end surface defines a cutout communicating with the receiving hole, the operating module further comprises a protective cover pivotably attached to the housing to cover the cutout, a portion of the operating element shielded by the protective cover.

3. The battery cover latching assembly as claimed in claim 2, wherein a first latching arm and a second latching arm project from the protective cover, the housing defines a first slit and a second slit, the first latching arm is received in the first slit, and the second latching arm is received in the second slit.

4. The battery cover latching assembly as claimed in claim 3, wherein the second latching arm is longer than the first latching arm.

5. The battery cover latching assembly as claimed in claim 1, wherein the housing defines a receiving cavity communicating with the receiving hole, the operating element is slidably received in the receiving cavity.

6. The battery cover latching assembly as claimed in claim 1, wherein the housing defines two through holes, a resisting portion projects from one side the operating element for resisting the elastic element, the two projections pass the two through holes and latch with the operating element.

7. A portable electronic device comprising:
a housing defining a receiving hole;
an operating module comprising an operating element and an elastic element elastically positioned between the housing and the operating element, the operating element slidably attached to the housing, the operating element being a long beam, and including two opposite ends and a notch adjacent to one of the two opposite ends, an operating block integrally projected from one surface of the operating element and sildably received in the receiving hole;
a battery cover pivotably attached to the housing and including two projections for respectively for respectively latching with the two ends of the operating element;
wherein the operating block is slid relative to the housing to deform the elastic element, the operating element is moved to separate from one of the projections, and align the notch with the other of the projections for allowing the battery cover to be removed from the housing.

8. The portable electronic device as claimed in claim 7, wherein the housing includes a first surface, a second surface, and a end surface, the first surface defines a battery compartment, the second surface is opposite to the first surface, the end surface is connected between the first surface and the second surface, and defines a cutout communicating with the receiving hole, the operating module further comprises a protective cover pivotably attached to the housing to cover the cutout, a portion of the operating element and the connector hole are shielded by the protective cover.

9. The portable electronic device as claimed in claim 8, wherein a first latching arm and a second latching arm the protective cover, the housing defines a first slit and a second slit, the first slit and the second slit are arranged at the two sides of the connector hole, the first latching arm is received in the first slit, and the second latching arm is received in the second slit.

10. The portable electronic device as claimed in claim 9, wherein the second latching arm is longer than the first latching arm.

11. The portable electronic device as claimed in claim 7, wherein the housing defines a receiving cavity communicating with the receiving hole, the operating element is slidably received in the receiving cavity.

12. The portable electronic device as claimed in claim 7, wherein the housing defines two through holes, a resisting portion projects from one side the operating element for resisting the elastic element, the two projections pass the two through holes and abut with the operating element.

13. The battery cover latching assembly as claimed in claim 2, wherein a post is projected from the second surface, the elastic element is a compression spring having a coiled portion on one end, the coiled portion is coiled around the post.

14. The battery cover latching assembly as claimed in claim 2, wherein two hooks are projected from the second surface, the operating element is slidably retained under the hooks.

15. A battery cover latching assembly comprising:

a housing defining a receiving hole;

an operating module comprising an operating element and an elastic element elastically positioned between the housing and the operating element, the operating element slidably attached to the housing, the operating element being a long beam, and including two opposite ends and a notch adjacent to one of the two opposite ends, an operating block integrally projected from one surface of the operating element and sildably received in the receiving hole;

a battery cover removably attached to the housing and including two projections for respectively latching with the two ends of the operating element; and a protective cover pivotably attached to the housing to shield the operating block;

wherein the protective cover is rotated to expose the operating block to facilitate movement of the operating block, and the operating block is slid relative to the housing to deform the elastic element, the operating element is moved to separate from one of the projections, and align the notch with the other of the projections for allowing the battery cover to be removed from the housing.

16. The portable electronic device as claimed in claim 15, wherein the housing defines a cutout and a connector hole, the cutout communicates with the receiving hole and the connector hole, the protective cover covers the cutout and the connector hole, a portion of the operating element and the connector hole are shielded by the protective cover.

* * * * *